United States Patent
Scepaniak et al.

(10) Patent No.: US 11,795,696 B1
(45) Date of Patent: Oct. 24, 2023

(54) ROOF ROCK SPREADER

(71) Applicant: Scepaniak IP Holdings, LLC, Waite Park, MN (US)

(72) Inventors: Kurtis D. Scepaniak, Cold Spring, MN (US); Michael S. Marquette, Melrose, MN (US); Travis M. Marquette, Bowlus, MN (US)

(73) Assignee: Scepaniak IP Holdings, LLC, Waite Park, MN (US)

( * ) Notice: Subject to any disclaimer, the term of this patent is extended or adjusted under 35 U.S.C. 154(b) by 0 days.

(21) Appl. No.: 17/567,878

(22) Filed: Jan. 3, 2022

Related U.S. Application Data

(63) Continuation of application No. 16/679,149, filed on Nov. 8, 2019, now Pat. No. 11,214,967.

(60) Provisional application No. 62/757,750, filed on Nov. 8, 2018.

(51) Int. Cl.
  *B65G 67/24* (2006.01)
  *E04D 15/07* (2006.01)
  *G01G 19/08* (2006.01)

(52) U.S. Cl.
  CPC ............. *E04D 15/07* (2013.01); *B65G 67/24* (2013.01); *G01G 19/08* (2013.01); *B65G 2201/042* (2013.01)

(58) Field of Classification Search
  CPC ...... E04D 15/07; B65G 67/606; B65G 67/24; B65G 2201/042; G01G 19/08
  See application file for complete search history.

(56) References Cited

U.S. PATENT DOCUMENTS 6,093,247 A * 7/2000 Sipos .................... B05B 9/007
  222/110

* cited by examiner

*Primary Examiner* — Saul Rodriguez
*Assistant Examiner* — Willie W Berry, Jr.
(74) *Attorney, Agent, or Firm* — Albert W. Watkins

(57) ABSTRACT

A roof rock spreader has a rock hopper and a motive drive system. An optical system detects areas already treated and areas still in need of treatment. Location aware sensors detect present location and speed of travel. A control system determines proper application paths and locations, and controls application of roof rock to provide an even and consistent layer. When the rock hopper empties, the roof rock spreader will move to a refill location. A laser alignment system detects and confirms proper hopper positioning prior to automated refill. During the refilling procedure, wheel load sensors monitor hopper fill. Rock hopper refill may be limited, to accommodate gross vehicle weight limitations of a particular roof. A communication system provides remote viewing through the optical system or other camera to confirm proper function, provides remote emergency shut-off, and enables a plurality of like spreaders to work in unison.

1 Claim, 9 Drawing Sheets

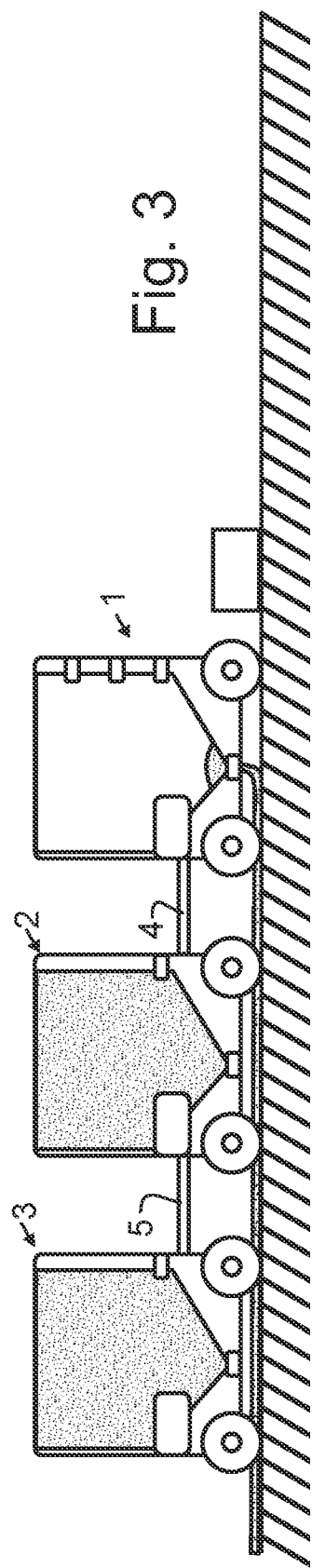
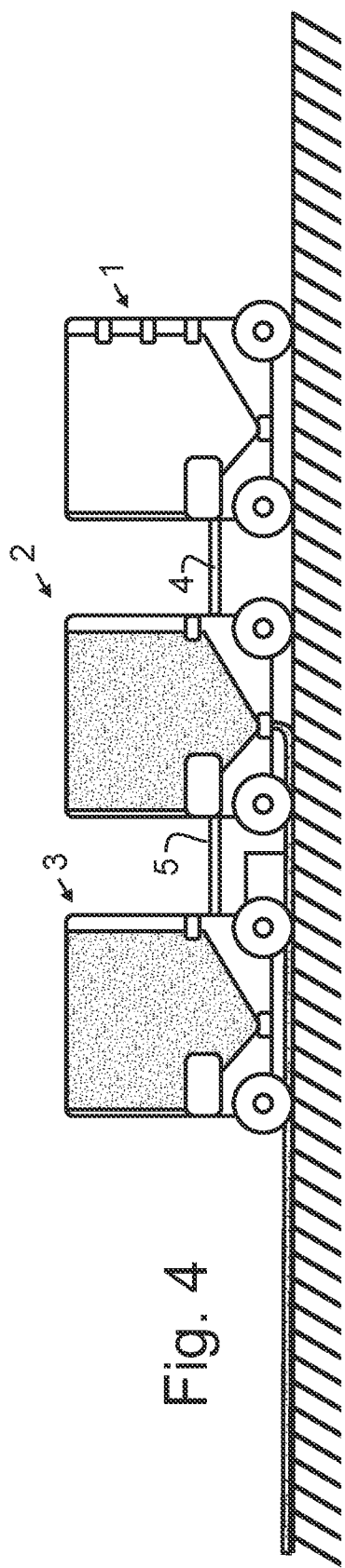
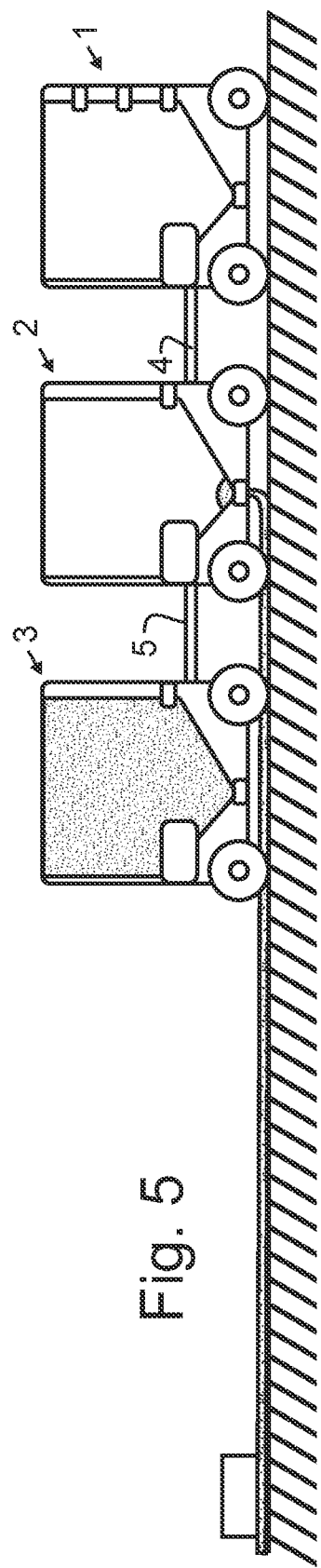
Fig. 3
Fig. 4
Fig. 5

ROOF ROCK SPREADER

CROSS REFERENCE TO RELATED APPLICATIONS

The present application claims the benefit of U.S. provisional patent application 62/757,750 filed Nov. 8, 2018 of like title, the teachings and entire contents which are incorporated herein by reference.

BACKGROUND OF THE INVENTION

1. Field of the Invention

The present invention pertains generally to the commercial building construction industry, and more specifically to the construction and maintenance of a commercial roof. In a particular manifestation, the present invention provides an automated apparatus for applying roof rock to the top of a commercial roof.

2. Description of the Related Art

Constructing commercial roofs is a labor intensive and time consuming process. The roof may for exemplary and non-limiting purpose be constructed of a plurality of layers, such as tar or other bituminous materials, polymer or rubber sheets, insulation, and other beneficial materials. These layers are applied and may in many but not all cases be glued or otherwise adhered together and down to the roof structure. The last or uppermost layer is a layer of pebbles or rocks spread a few inches thick over the remaining roof layers. These rocks provide a protective cover that increases the life of the roof by blocking harmful sunlight, hail, and the like, and by providing thermal insulation to reduce the extremes of temperature cycling, and by providing a mechanical layer that is also beneficial. In addition, in the case of some roofs, such as those commonly referred to as ballasted roofs, the roofing rock also anchors the remaining roofing material in place.

Currently, the roofing rock is put into a cart at the outside edge of the building in a staging area. The rock in either conveyed into the cart with a conveyer, or a crane puts the rock in a hopper and then the rock cart pulls under the hopper. The hopper is next manually opened to fill the rock cart. After the rock cart is full, the hopper is subsequently manually closed. The full rock cart is either entirely manually moved, or in some instances the rock cart is motor powered. In either case, a person walks with the cart to where the rock is to be spread.

Rock is to be installed in a certain thickness and/or weight per square foot. A 100,000 square foot roof will typically require at least 1 million pounds of installed rock. The placing of a consistent layer of rocks is especially labor intensive and time consuming, putting workers' health at risk and substantially increasing the cost of installing or replacing a commercial roof. Further, the amount of placed rock is difficult to judge, and time consuming to measure. Because of human error in judgement, the roof surface is at a higher risk of blow-off or failing earlier because of UV light on an under-protected roof surface.

For some roofing projects and processes, roofrocking machinery may be provided to improve safety, decrease fatigue, and improve job quality. Exemplary U.S. patents, the teachings which are incorporated herein by reference, include: U.S. Pat. No. 2,922,539 by Figge, entitled "Complete roofing method and apparatus"; U.S. Pat. No. 2,949,206 by Figge, entitled "Roofing method and apparatus"; U.S. Pat. No. 3,122,862 by Figge, entitled "Method of roofing"; U.S. Pat. No. 4,540,312 by Allen, entitled "Material spreader system with column bypass"; and U.S. Pat. No. 4,541,750 by Owens, entitled "Surface spreader with column bypass". In addition to the aforementioned patents, there are also commercial rock spreading machines that operate in the manner of a powered fertilizer spreader or the like. While these inventions each offer significant advantage over the manual roofing cart, in many of these machines there is still only minimal control over the depth, adjacent path overlap to provide consistent coverage, capability for detection of proper fill volume, detection of fill alignment prior to initiating a rock refill, and many other features that are vital to more complete and effective completion of this critical roofing process.

Additional U.S. patents exemplary of coating and roofing applications, the teachings which are incorporated herein by reference, include: U.S. Pat. No. 2,176,891 by Crom, entitled "Method of coating passages; U.S. Pat. No. 2,937,779 by Reustle, entitled "Asphalt roof laying machine"; U.S. Pat. No. 3,093,936 by Figge, entitled "Roofing apparatus"; U.S. Pat. No. 5,205,103 by Burton, entitled "Shingle laying apparatus"; U.S. Pat. No. 5,381,597 by Petrove, entitled "Automatic robot roofer for installation of shingles"; U.S. Pat. No. 6,024,147 by Hunter, Jr., entitled "Spray applicator for roofing and other surfaces"; U.S. Pat. No. 6,117,256 by Hunter, Jr., entitled "Method of applying spray-applied foam to roofing and other surfaces"; U.S. Pat. No. 6,126,766 by Hunter, Jr., entitled "Method of applying a spray-applied foam to roofing and other surfaces"; U.S. Pat. No. 6,358,344 by Hunter, Jr., entitled "Spray applicator for roofing and other surfaces"; U.S. Pat. No. 6,935,089 by Jolitz et al, entitled "Methods of manufacturing roofing products"; U.S. Pat. No. 7,641,461 by Khoshnevis, entitled "Robotic systems for automated construction"; U.S. Pat. No. 7,700,028 by Jolitz et al, entitled "Method for manufacturing roofing products"; U.S. Pat. No. 8,414,722 by Burgess et al, entitled "Roofing apparatus"; U.S. Pat. No. 8,880,334 by Kini et al, entitled "Machine control system having autonomous edge dumping"; and U.S. Pat. No. 9,945,128 by Baird, entitled "Automatic roof shingle removal and installation system".

There is also an additional very large body of patents and associated technology surrounding general purpose robotic carts, also referred to as autonomous guided vehicles (AGV) or self-guided vehicles (SGV). Exemplary U.S. patents, the teachings which are incorporated herein by reference, include: U.S. Pat. No. 4,492,504 by Hainsworth, entitled "Material handling system"; U.S. Pat. No. 6,944,944 by Craythorn et al, entitled "Fastening machines"; U.S. Pat. No. 7,591,630 by Lert, Jr., entitled "Materials-handling system using autonomous transfer and transport vehicles"; U.S. Pat. No. 7,972,102 by Ward et al, entitled "Automated marine container terminal and system"; U.S. Pat. No. 7,980,808 by Chilson et al, entitled "Automatic transport loading system and method"; U.S. Pat. No. 7,991,505 by Lert, Jr. et al, entitled "Materials-handling system using autonomous transfer and transport vehicles"; U.S. Pat. No. 8,192,137 by Ross et al, entitled "Automatic transport loading system and method"; U.S. Pat. No. 8,210,791 by Chilson et al, entitled "Automatic transport loading system and method"; U.S. Pat. No. 8,529,187 by Ward et al, entitled "Automated marine container terminal and system"; U.S. Pat. No. 8,596,951 by Ward et al, entitled "Automated marine container terminal and system"; U.S. Pat. No. 8,784,034 by Lert, Jr., entitled "Materials-handling system using autonomous transfer and transport vehicles"; U.S. Pat. No. 8,845,266 by Ward et al, entitled "Automated marine container terminal and system"; U.S. Pat. No. 8,899,903 by Saad et al, entitled "vehicle base station"; and U.S. Pat. No. 9,834,380 by Hamilton et al, entitled "Warehouse automation systems and methods".

In addition, various artisans have developed various sensors and control systems useful for such exemplary purposes as machine vision, object detection, and navigation. Exemplary U.S. and Foreign patents and published applications, the teachings which are incorporated herein by reference, include: U.S. Pat. No. 8,855,848 by Zeng, entitled "Radar, lidar and camera enhanced methods for vehicle dynamics estimation"; U.S. Pat. No. 8,855,849 by Ferguson et al, entitled "Object detection based on known structures of an environment of an autonomous vehicle"; U.S. Pat. No. 8,874,300 by Allard et al, entitled "Systems and methods for obstacle avoidance"; U.S. Pat. No. 8,874,371 by Troy et al, entitled "Beam directed motion control system"; U.S. Pat. No. 8,880,271 by Jeon, entitled "Robot cleaner and method for controlling the same"; U.S. Pat. No. 8,886,383 by Hyde et al, entitled "Automated systems, devices, and methods for transporting and supporting patients"; U.S. Pat. No. 8,886,385 by Takahashi et al, entitled "Autonomous mobile body and control method of same"; U.S. Pat. No. 8,897,917 by Tanaka et al, entitled "Autonomous mobile device"; and U.S. Pat. No. 8,897,947 by Nakano et al, entitled "Autonomous mobile device".

Additional patents of varying relevance, the relevant teachings and contents which are incorporated herein by reference, include: U.S. Pat. No. 8,874,360 by Klinger et al, entitled "Autonomous vehicle and method for coordinating the paths of multiple autonomous vehicles"; and U.S. Pat. No. 8,880,334 by Kini et al, entitled "Machine control system having autonomous edge dumping"; each that describe plural and simultaneous robots; U.S. Pat. No. 8,857,137 by Avnery, entitled "Robotic lawn mower for cutting around conveyance member"; U.S. Pat. No. 8,868,301 by Self et al, entitled "Determination of remote control operator position" that describes diverse issues w/autonomous vehicles; and U.S. Pat. No. 8,892,294 by Waltz et al, entitled "Vehicle control limits" that describes many issues with checking autonomous vehicle status.

In addition to the foregoing patents, Webster's New Universal Unabridged Dictionary, Second Edition copyright 1983, is incorporated herein by reference in entirety for the definitions of words and terms used herein.

As may be apparent, in spite of the enormous advancements and substantial research and development that has been conducted, there still remains a need for a roof rock spreader that may efficiently, autonomously, and reliably spread roof rock.

SUMMARY OF THE INVENTION

In a first manifestation, the invention is a roof rock spreader having a motive drive, a rock hopper, an optical detector, and a control system. The motive drive is configured to convey the roof rock spreader about a building roof. The rock hopper is configured to temporarily store roofing rocks and subsequently discharge the roofing rocks to the building roof. The optical detector distinguishes treated and untreated areas of the building roof. The control system is responsive to the optical detector to control the motive drive and rock hopper to traverse the building roof while distributing roof rock in an even and consistent layer.

In a second manifestation, the invention is a method of spreading roofing rock about a building roof. In accord with the method, a refillable rock hopper is at least partially filled with roofing rocks at a fill station. The refillable rock hopper is conveyed about the building roof while discharging roofing rocks to the roof. The refillable rock hopper is returned to the fill station. Proper positioning of the refillable rock hopper is detected. The refillable rock hopper is refilled responsive to the step of detecting proper positioning of the refillable rock hopper.

In a third manifestation, the invention is a roof rock spreader having a motive drive, a rock hopper, at least one wheel load sensor, and a control system. The motive drive is configured to convey the roof rock spreader about a building roof. The rock hopper is configured to temporarily store roofing rocks and subsequently discharge the roofing rocks to the building roof. The at least one wheel load sensor is configured to detect a weight of at least the rock hopper and any contents thereof. The control system is configured to limit an extent of fill of the rock hopper responsive to the at least one wheel load sensor.

OBJECTS OF THE INVENTION

Exemplary embodiments of the present invention solve inadequacies of the prior art by providing a roof rock spreader having a rock hopper, a laser alignment system to detect and confirm proper hopper positioning for automated refill, wheel load sensors to detect proper hopper fill, an optical system to detect areas already treated, location aware sensors to detect and determine proper treatment paths and location, and a drive system configured to move the spreader about the roof.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a roof rock spreader that may efficiently, autonomously, and reliably spread a consistent and controlled layer of roof rocks. A second object of the invention is to improve safety, decrease fatigue, and improve job quality when spreading roof rocks. Another object of the present invention is to control depth and adjacent path overlap to provide consistent roof rock coverage. A further object of the invention is to detect proper hopper fill alignment prior to initiating a rock hopper refill, and proper fill load. Yet another object of the present invention is to detect and determine proper roof rock application paths and locations.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIGS. 3-5 illustrate an alternate embodiment roof rock spreader applying rocks to a commercial roof from a side elevational and somewhat simplified view similar to that of FIG. 1.

DESCRIPTION OF THE PREFERRED EMBODIMENT

Manifested in the preferred and alternative embodiments, an automated roof rock spreader designed in accord with the teachings of the present invention transports and dispenses rock across the roof. The present invention is designed to remove a substantial portion of the time consuming process of applying rocks to a commercial roof, and replace this labor with an automated spreader. To navigate the roof, the roof rock spreader is most preferably fitted with GPS and other sensors. Through the detection of roof features and adequately spread rock, the roof rock spreader is configured to autonomously apply rocks to the roof, and completely cover the roof in a consistent layer of rock. To prevent locally overloading the roof structure, the roof rock spreader has a limited capacity which is regularly refilled by crane or other similar conveyance means configured to dispense the rock into the roof rock spreader.

Figure 1:
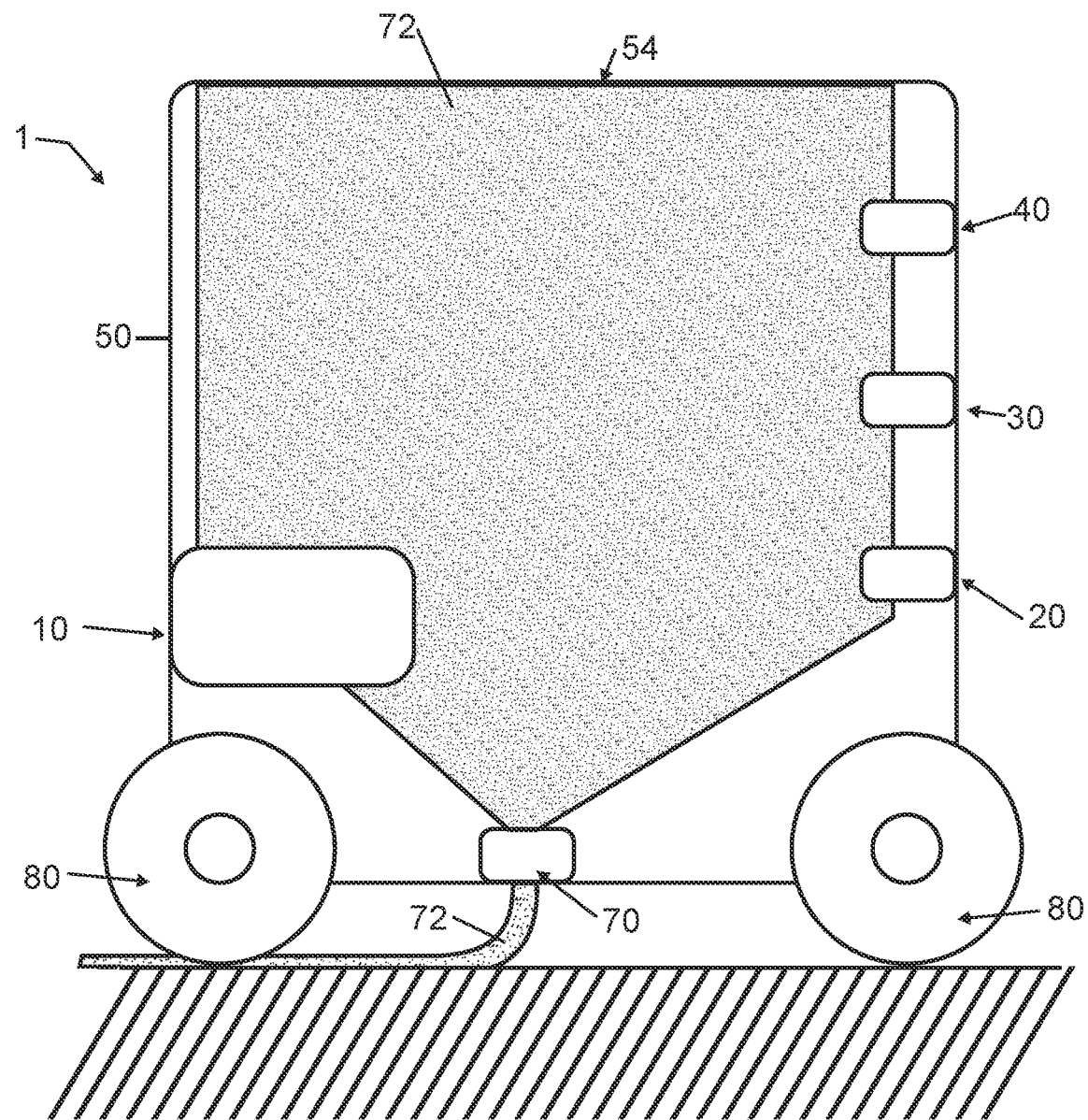
FIG. 1 illustrates a preferred embodiment roof rock spreader designed in accord with the teachings of the present invention from a side elevational and somewhat simplified view to reveal critical components.
Figure 2:
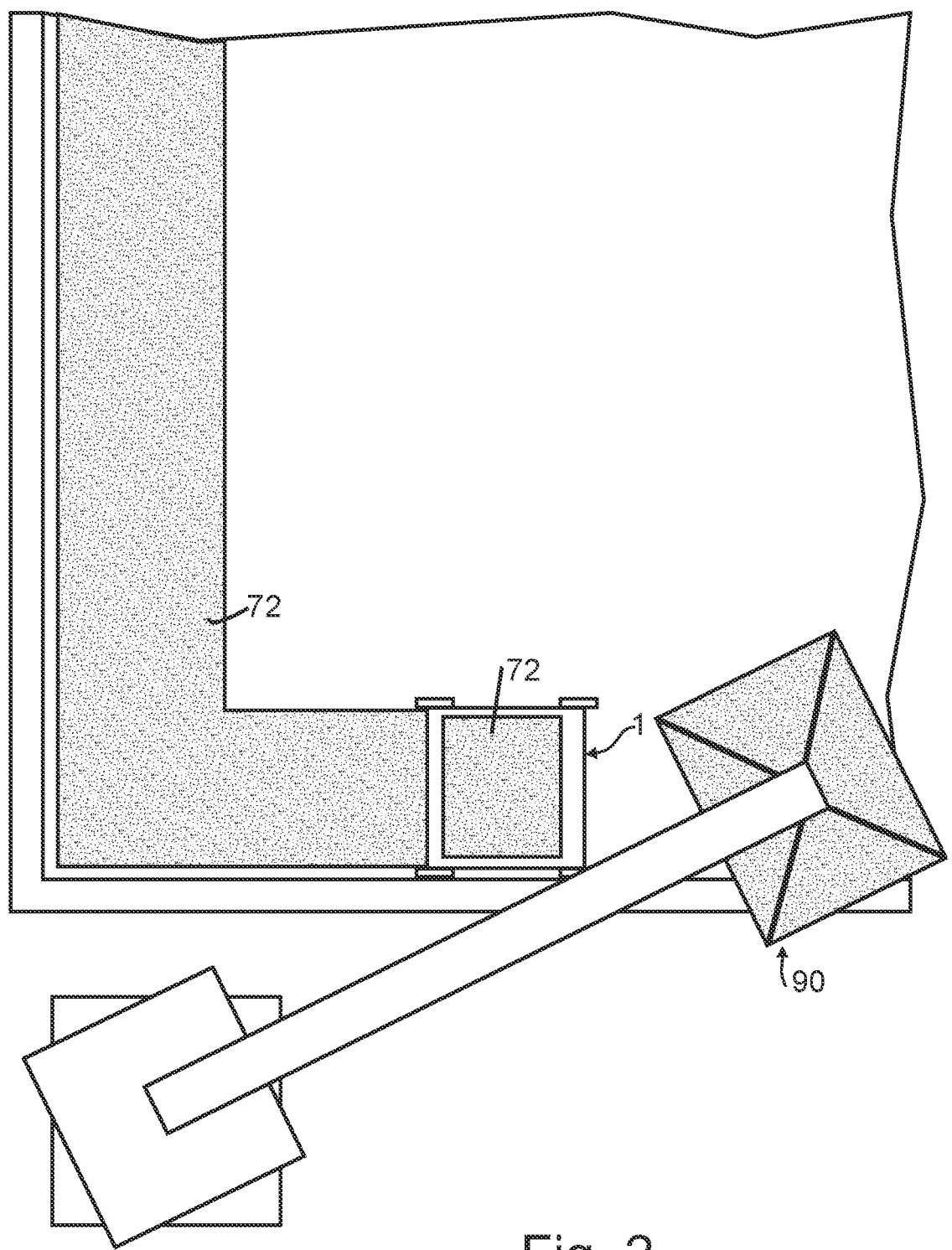
FIG. 2 illustrates the preferred embodiment roof rock spreader of FIG. 1 applying rocks to a commercial roof from a top plan view looking down on the roof.
Figure 6:
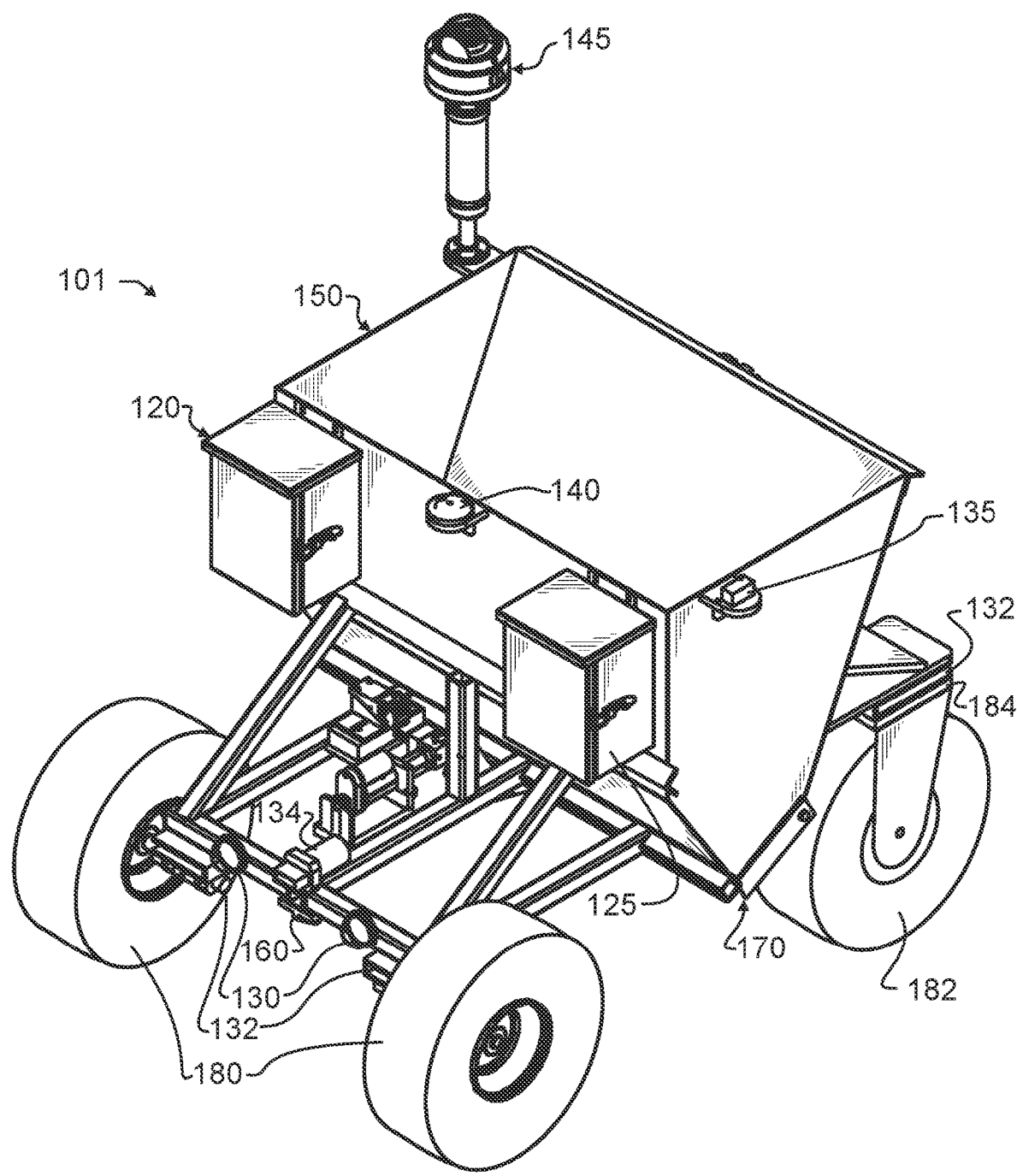
FIGS. 6-11 illustrate a second preferred embodiment roof rock spreader designed in accord with the teachings of the present invention from isometric, top plan, front elevational, rear elevational, side elevational, and bottom plan views, respectively.
Figure 7:
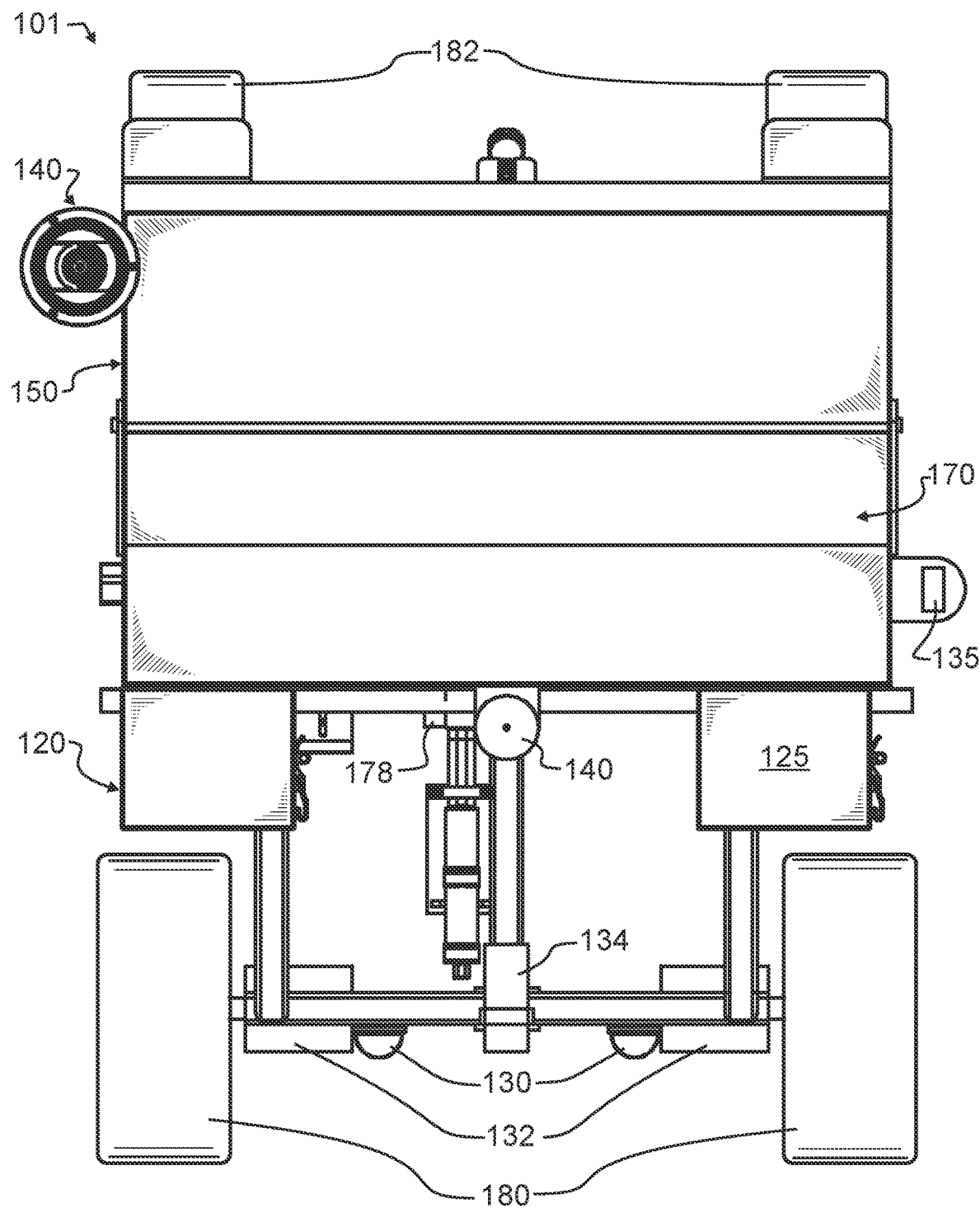
Figure 8:
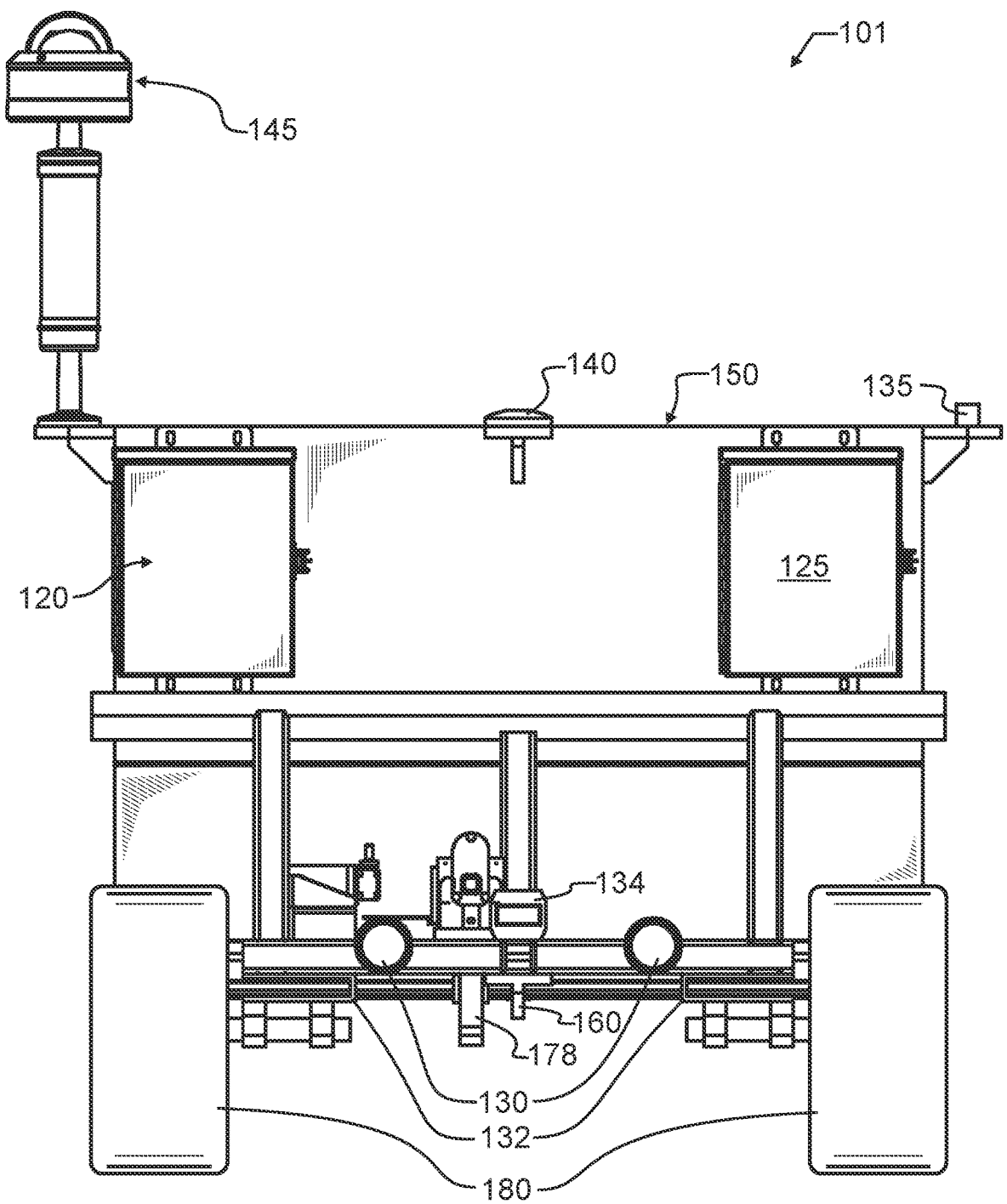
Figure 9:
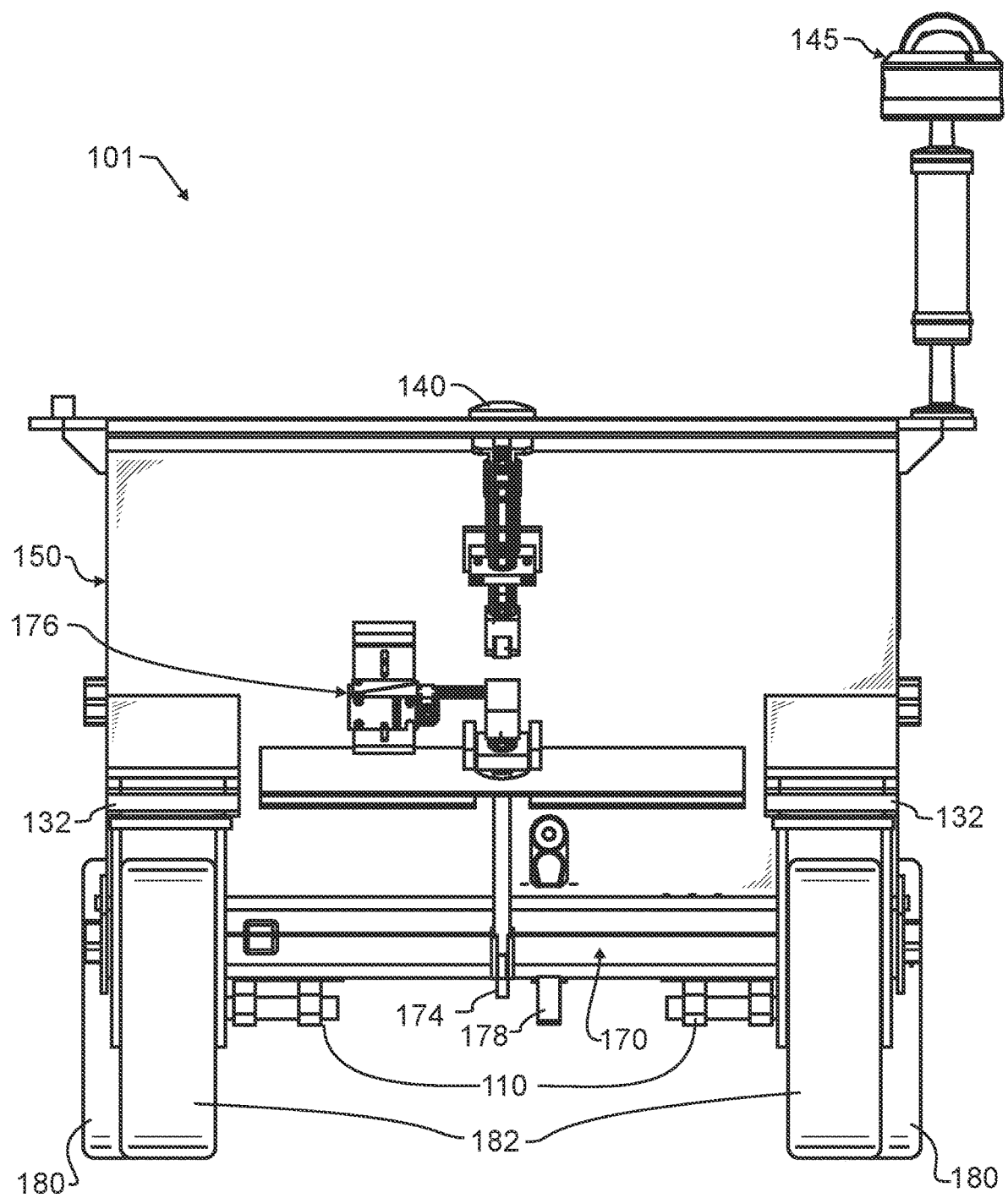
Figure 10:
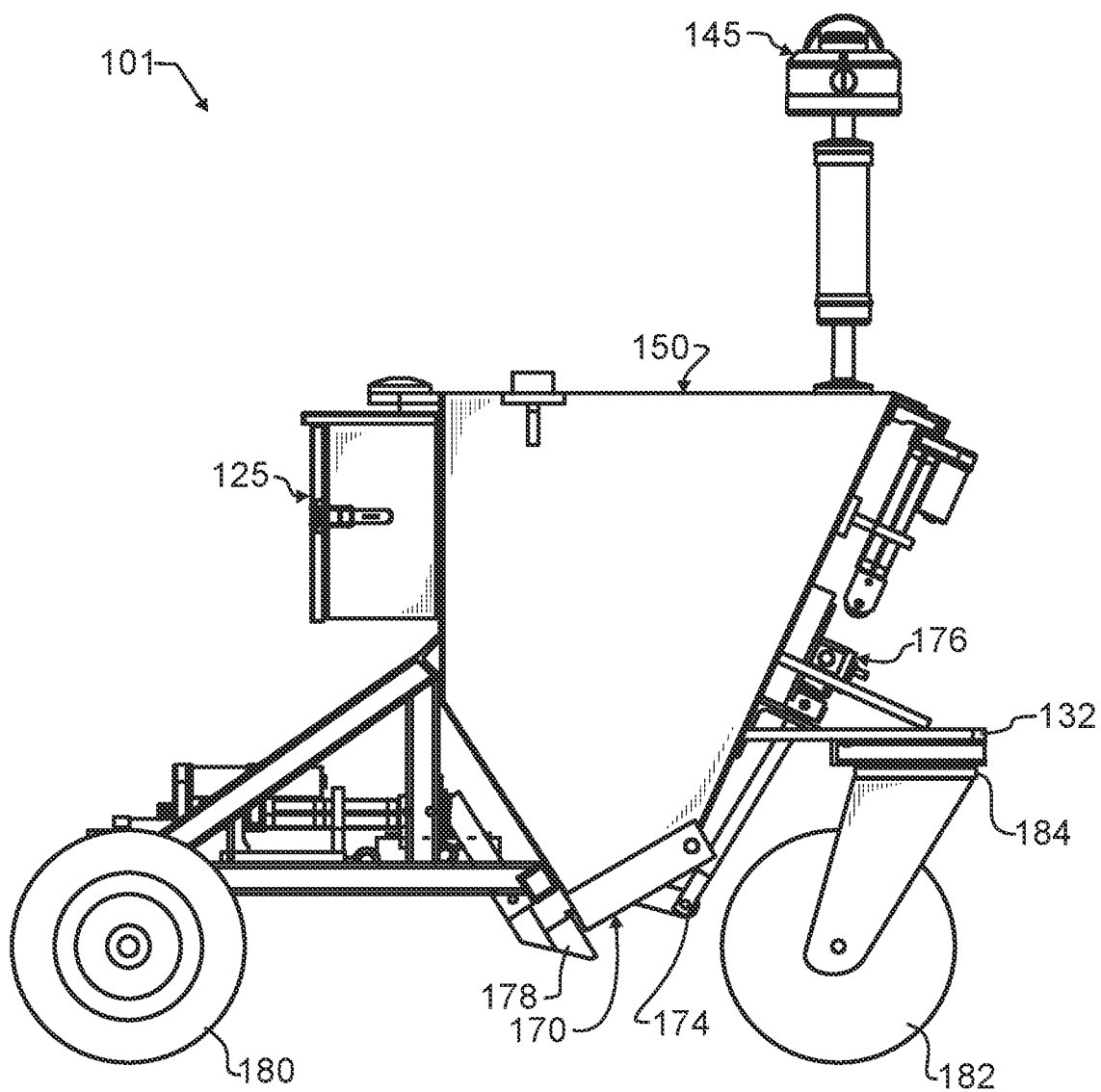
Figure 11:
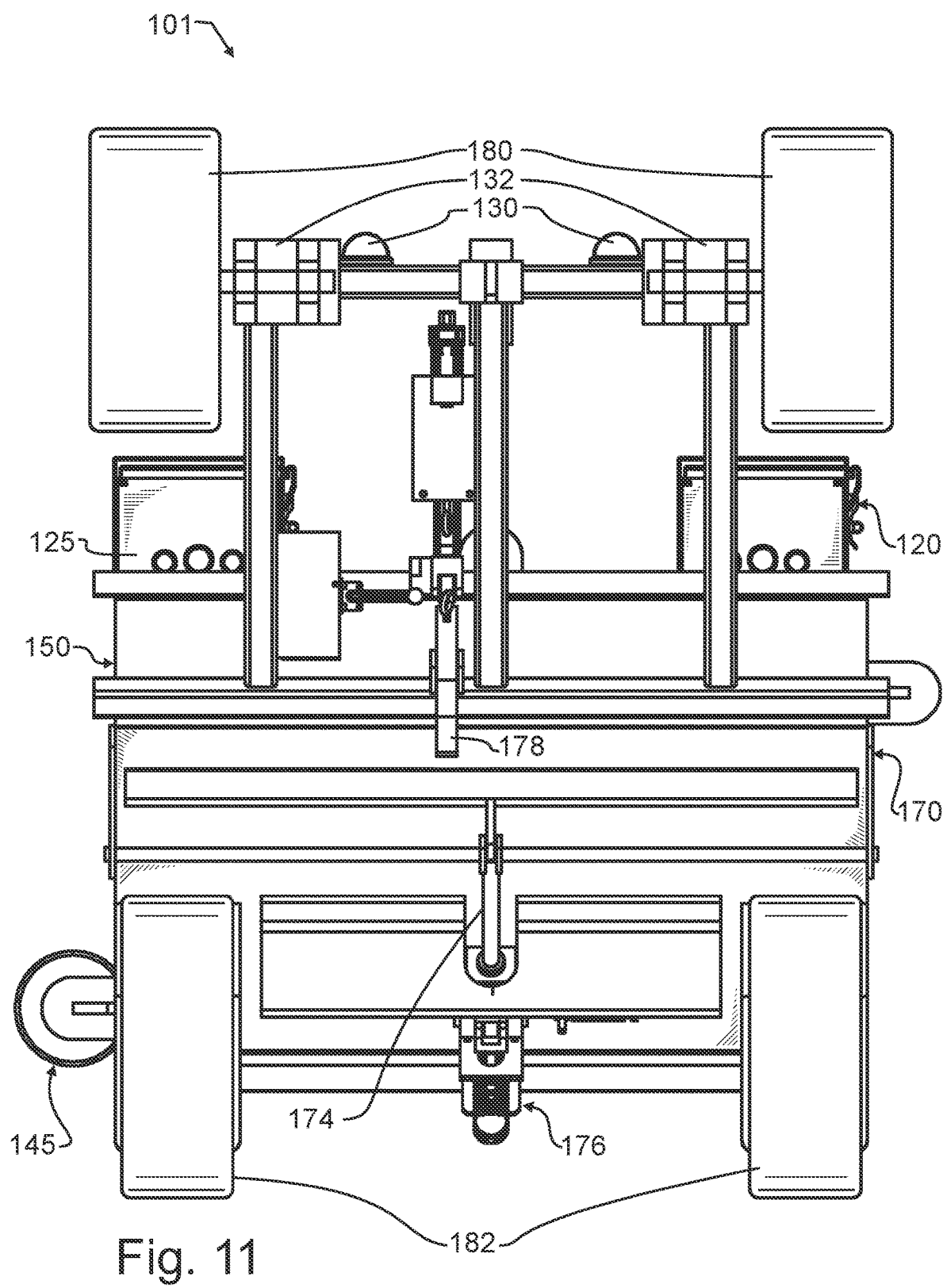

In a preferred embodiment of the invention illustrated in FIGS. 1 and 2, roof rock spreader 1 is comprised of an outer container 50, and a rock hopper 54 which holds rocks 72. While rock hopper 54 is illustrated in the preferred embodiment as a separate container, in alternative embodiments rock hopper 54 may be a cavity formed into an interior of outer container 50.

Outer container 50 is supported by wheels 80 which are driven by motor 10. Motor 10 may comprise any suitable type or number of motive power sources, including for exemplary and non-limiting purpose an internal combustion engine, external combustion engine, an electrical motor, or electric motors for two or more of the wheels. The drive may be direct, particularly in the case of a plurality of electric motors, but will more typically include suitable transmission means either provided within motor 10 or intermediate between motor 10 and wheels 80. For exemplary and non-limiting purpose, suitable transmission means may include not only gearing but also differentials, and may be provided to either one or any number of wheels, as desired and appropriate at design time. Furthermore, the wheels in some embodiments may be individually supported and driven, and in other embodiments may be coupled together on common axles.

Most preferably, wheels 80 will be relatively large, both in diameter and in width. The large diameter will more readily permit wheels 80 to traverse any small obstacles or already spread rock, and the width will increase the surface area supporting the weight of the rocks 72 still carried within roof rock spreader 1. While pneumatic wheels are preferred since they are generally less likely to damage the roof, in some alternative embodiments solid wheels may be provided, and in other alternative embodiments tracks similar to those used on some skid-steers, bulldozers, and tanks may be provided instead of wheels. In other alternative embodiments, other known apparatus for supporting and propelling roof rock spreader 1 may be provided instead of wheels 80 or tracks.

To accommodate the borders, vents, and other obstacles on the roof, a processor 20 will access one or more sensors 30 and, optionally, GPS unit 40, and responsive thereto direct the movement of roof rock spreader 1 and control the application of rocks 72 through controlled orifice and rock sensor 70. Sensors 30 will preferably include apparatus capable of distinguishing rocks already spread on the roofing underlayment from areas to be covered, and also capable of detecting and identifying obstacles such as the roof parapets, HVAC apparatus, vents, skylights and other roof penetrations, and the like. A suitable system may for exemplary and non-limiting purpose comprise a computer vision system using visible light and appropriate software to detect and identify rocks 72, various roof features, and obstacles. However, in alternative embodiments, other types of sensors may be provided in addition or instead of a vision system. Again, for exemplary and non-limiting purpose an ultrasonic detector may be used to identify obstacles and assist with navigation. In further alternative embodiments, the roof geometry may be known and mapped, and navigation controlled responsive to a map stored within memory provided within or in addition to processor 20. Such a navigation system may preferably be provided within preferred embodiment roof rock spreader 1, but in alternative embodiments may be housed separately therefrom. Where a map and navigation system is used, processor 20 may very simply guide preferred embodiment roof rock spreader 1 about the roof. In such instance, input from sensors 30 may be used to confirm positions anticipated by processor 20, such as when approaching or moving adjacent to a parapet. Where a map is provided and used directly by processor 20, the map may be retrieved from another device or apparatus and transferred through suitable communications to processor 20 for storage.

In order to provide map-based navigation, and whether the navigation is controlled entirely within preferred embodiment roofrock spreader 1 or by apparatus external thereto, a communication channel is required. Exemplary communications might for exemplary and non-limiting purpose comprise wireless techniques such as Bluetooth™ wireless communications, Near-Field Communications (NFC), and other radio or optical communications, or direct electrical connections such as through a USB or other wired connection. Wireless techniques are most preferred, owing to the ready availability, low cost, and need for a durable communications channel even in the presence of falling rock and substantial dust exposure.

When a communications channel is provided and sensor 30 comprises a computer vision system, video from sensor 30 may be transmitted from preferred embodiment roof rock spreader 1 to a separate device. This may preferably be configured to enable a person to monitor the movements of preferred embodiment roof rock spreader 1 and to view the video from sensor 30. This combination greatly facilitates remote monitoring of the proper operation and progress of preferred embodiment roof rock spreader 1. In addition, and where desired, preferred embodiment roof rock spreader 1 may further be provided with suitable audio and visual notification apparatus to signal when preferred embodiment roof rock spreader 1 is moving. Such notification apparatus may for exemplary and non-limiting purpose comprise an electronic bell or chime and a light the light which may be illuminated or flashed and the bell which may be sounded when preferred embodiment roof rock spreader 1 is moving.

In some instances, a GPS unit 40 may be provided. In such instance, a map may be provided in advance in association with GPS coordinates, or the map may be generated if not pre-existing. In these instances where a GPS unit 40 is provided, the precision of detected GPS position may be improved through the use of a differential GPS system, where a fixed GPS position detector is provided in the vicinity of and in communication with preferred embodiment roof rock spreader 1 to compare position information therewith. It is known that GPS and other satellite systems are subject to both accidental and intentional drift and variation. When a fixed position receiver is used near to preferred embodiment roof rock spreader 1, then a sudden shift detected by both preferred embodiment roof rock spreader 1 and the fixed position receiver will be used to determine that there was, in fact, no such shift (the fixed position receiver has not moved).

When preferred embodiment roofrock spreader 1 is provided with GPS unit 40 and a suitable communications apparatus, more than one preferred embodiment roof rock spreader 1 may be operated upon a single roof. In such instance, each one of preferred embodiment roof rock spreaders 1 will preferably communicate with others, for exemplary purposes to communicate which area(s) still require rock such that when one preferred embodiment roof rock spreader 1 fully discharges rock, another preferred embodiment roof rock spreader 1 may be advised where to travel to and spread rock to continue the process, by providing suitable GPS coordinates and/or other information.

Detection of presence or absence of rocks 72 within rock hopper 54 in preferred embodiment roof rock spreader 1 is accomplished using controlled orifice and rock sensor 70. As illustrated, controlled orifice and rock sensor 70 may comprise any suitable sensor, operative to detect rocks either in the orifice or in the lower portion of rock hopper 54. For exemplary and non-limiting purpose, suitable sensors include an ultrasonic or optical detector which will detect either a void or presence of rock, a sonic sensor detecting movement of rock from rock hopper 54 or through the orifice, a weight or pressure sensor detecting the force of the rock, or other suitable sensor.

Controlled orifice and rock sensor 70 will also provide controlled and selective release of rock 72 therefrom. As illustrated, in preferred embodiment roof rock spreader 1 the rocks 72 are fed solely under the force of gravity. In this embodiment, the orifice may simply be a slot in the bottom of rock hopper 54 that extends substantially the full width of preferred embodiment roof rock spreader 1, but which is relatively short in the direction of travel. Rock 72 will simply be funneled into controlled orifice and rock sensor 70 by gravity, and will pass through the slot which will cause the rock to be deposited in a transverse strip. As preferred embodiment roof rock spreader 1 moves forward, the transverse strip of rock will also progress forward, deposited to a width defined by the longest dimension or length of the slot. The width of the slot extends in the direction of travel. Consequently, the width of the slot and speed of travel will control the thickness of rock 72 being deposited upon the roof. In preferred embodiment roof rock spreader 1, and as noted herein above, controlled orifice and rock sensor 70 will also provide controlled and selective release of rock 72 therefrom. In order to do so, a suitable discharge control is provided. A pivotal flap or cover will most preferably be provided as known in the art of dispenser discharge control which may be activated, such as by motor-controlled rotation for exemplary and non-limiting purpose, to selectively either cover the slot and thereby block discharge of the rock 72, or be rotated ninety degrees to a perpendicular position which allows rock 72 to pass almost without obstruction. Positions intermediate thereto will control the rate of discharge of rock 72 from rock hopper 54. Processor 20 will most preferably control both the speed of preferred embodiment roofrock spreader 1 through control of motor 10 or transmission associated therewith, and will also control controlled orifice and rock sensor 70 in association with the motion control of preferred embodiment roof rock spreader 1, to thereby obtain a smooth and even depth of rock.

In alternative embodiments, feed mechanisms other than gravity feed may be provided, and distribution mechanisms may be provided other than a slot-shaped controlled orifice. For exemplary and non-limiting purpose, in some alternative embodiments a belt, auger, or other known discharge assistant may be provided to move rock 72 from rock hopper 54. Similarly, in some alternative embodiments various spreaders may be provided that are designed for even distribution of rock, including but not solely limited to centrifugal slingers or spreaders, and other known techniques.

When rock hopper 54 is emptied, which may for exemplary and non-limiting purpose be detected by controlled orifice and rock sensor 70, preferred embodiment roof rock spreader 1 is configured to travel to crane 90, where rock hopper 54 will be refilled. While a crane 90 is shown for illustrative purposes, other known means for dispensing rocks may be used in alternative embodiments. For exemplary and non-limiting purpose, such apparatus may include conveyors or other suitable apparatus.

In a first alternative embodiment of the invention illustrated in FIGS. 3, 4, and 5, roof rock spreader 1 is attached to additional roof rock spreading units 2 and 3 by means of attachment means 4 and 5. Attachment means 4 and 5 may for exemplary and non-limiting purpose comprise a trailer hitch or train car coupler which in some embodiments is not flexible, but which is preferably articulated to allow cornering.

When the rocks 72 are emptied from rock hopper 54 in roof rock spreader 1, such as for exemplary and non-limiting purpose detected by controlled orifice and rock sensor 70, the following roof rock spreader 2 will start distributing rocks 72 in an uninterrupted and level application onto the roof such as illustrated by FIG. 4. When roof rock spreader 2 has dispersed all of the rocks 72 it is carrying, roof rock spreader 3 will sequentially disburse the rocks 72 in an uninterrupted level application such as illustrated by FIG. 5.

While one or more drive or propulsion motors 10 may be provided in each one of roof rock spreaders 1-3, in an alternative embodiment only the lead roof rock spreader 1 is provided with a propulsion system. In another alternative embodiment, a separate drive unit may be provided ahead of roof rock spreader 1 that serves as the sole propulsion unit.

From the foregoing figures and description, several additional features and options become more apparent. First of all rock hopper 54, and outer container 50 may be manufactured from a variety of materials, including metals, resins and plastics, ceramics or cementitious materials, or even combinations or composites of the above. The specific material used may vary, though special benefits are attainable if several important factors are taken into consideration. First, outer container 50 needs to be durable and protect the internal working components of roof rock spreader 1. By using resilient materials, there is a dampening of energy in the event rocks 72 impact the outer container 50 and no permanent damage will be visible. Furthermore, it is preferable that all materials are sufficiently tough and durable to not fracture, even when great forces are applied thereto. In the case of outer container 50, one preferred material is steel, which has the advantages of being highly resilient to impacts, but suffers from having higher weights. An alternative material is Ultra-High Molecular Weight (UHMW) polyethylene, which has the advantages of being extremely tough and durable to withstand great force, scuff resistant, and light weight compared to its strength. For the rock hopper 54 one preferred material is steel, which has the advantage of being resilient to impacts, and abrasion, but also suffers from higher weights. An alternative material is a composite of UHMW polyethylene and wear pads made of the aforementioned materials which may also be made from UHMW polyethylene.

One way to overcome the weight limitations for the use of steel as the primary material is to combine the inner and outer walls of 50 and 54 (not shown) into one structure, and to move the GPS 40, sensor 30, and processor 20 into one compartment.

Various embodiments of apparatus designed in accord with the present invention have been illustrated in the various figures. The embodiments are distinguished by the hundreds digit, and various components within each embodiment designated by the ones and tens digits. However, many of the components are alike or similar between embodiments, so numbering of the ones and tens digits have been maintained wherever possible, such that identical, like or similar functions may more readily be identified between the embodiments. If not otherwise expressed, those skilled in the art will readily recognize the similarities and understand that in many cases like numbered ones and tens digit components may be substituted from one embodiment to another in accord with the present teachings, except where such substitution would otherwise destroy operation of the embodiment. Consequently, those skilled in the art will readily determine the function and operation of many of the components illustrated herein without unnecessary additional description.

In a second preferred embodiment of the invention illustrated in FIGS. 6-11, roof rock spreader 101 is comprised of a single outer container 150 that serves as a rock hopper which holds rocks. Outer container 150 is supported by wheels 180. While not separately illustrated, one or more of the wheels 180 may be driven by a motor in a manner similar to that disclosed herein above with regard to preferred embodiment roof rock spreader 1. Non-driven wheels are preferably provided with wheel swivels 184 to provide enhanced mobility.

Communications are preferably provided through communications system 125, which in some embodiments permits video from sensor 130 may be transmitted from preferred embodiment roof rock spreader 101 to a separate device. In such embodiments, a person may then monitor the movements of preferred embodiment roof rock spreader 101 and to view the video from sensor 130. This combination greatly facilitates remote monitoring of the proper operation and progress of preferred embodiment roof rock spreader 101.

Communications system 125 may further be used to report past, current, and future work, self-diagnostics and reporting, communicating with other types of equipment, and reporting to automated cloud-based systems as necessary or desired. Further, communication with cell phones or other devices will be provided in some alternative embodiments. In such case, a remote kill switch feature will be preferred for many embodiments, allowing a machine operator to remotely instantly shut off or stop the operation of preferred embodiment roof rock spreaders 1, 101.

The communications system 125 also allows a job lead, either during set-up for a job or after waterproofing/roofing is installed, to identify the area that rock is to be installed and the amount of rock in the area(s). After waterproofing/roofing is installed, the relevant information is sent through communications system 125 to one or more preferred embodiment roof rock spreaders 101. Once the preferred embodiment roof rock spreaders 101 receive and confirm the information, then they will drive to the loading area, be filled, spread the rock, and return to fill again. The preferred embodiment roof rock spreaders 101 will also preferably communicate with other spreaders as they also install the rock.

Suitable audio and visual notification apparatus 145 provides both visual and auditory signal when preferred embodiment roof rock spreader 101 is moving, and in some embodiments a camera is further be provided therewith. Such notification apparatus may for exemplary and non-limiting purpose comprise an electronic bell or chime and a light the light which may be illuminated or flashed and the bell which may be sounded when preferred embodiment roof rock spreader 101 is moving.

Preferred embodiment roof rock spreader 101 is provided with GPS unit 140 and a suitable communications system 125, meaning more than one preferred embodiment roof rock spreader 101 may be operated upon a single roof. In such instance, each one of preferred embodiment roof rock spreaders 101 will communicate with others, for exemplary purposes to communicate which area(s) still require rock such that when one preferred embodiment roof rock spreader 101 fully discharges rock, another preferred embodiment roof rock spreader 101 may be advised where to travel to and spread rock to continue the process, by providing suitable GPS coordinates and/or other information such as where rock was installed, the amount of rock to be installed in an area, amount of rock already installed in an area, and reporting of current, past, and planned location(s) of rock carts, and important locations of items including but not limited to where rock carts are to be filled.

Detection of presence or absence of rocks 72 within rock hopper 150 in preferred embodiment roof rock spreader 101 is accomplished using load sensors 132 coupled to each wheel 180. Nevertheless, in alternative embodiments one or more additional sensors comprising any suitable sensor operative to detect rocks either in the orifice or in the lower portion of rock hopper 150 may be provided. For exemplary and non-limiting purpose, suitable sensors include an ultrasonic or optical detector which will detect either a void or presence of rock, a sonic sensor detecting movement of rock from rock hopper 150 or through the orifice, a weight or pressure sensor detecting the force of the rock, or other suitable sensor.

Release of roof rock from rock hopper 150 is controlled through controlled orifice and rock sensor 170, which as illustrated, in preferred embodiment roofrock spreader 101 includes an orifice in the geometry of a slot in the bottom of rock hopper 150 that extends substantially the full width of preferred embodiment roof rock spreader 101, but which is relatively short in the direction of travel. For roof rock to pass out of rock hopper through controlled orifice and rock sensor 170, gate latch control 178 must first be released, and then gate opening lever 174 and gate opening control 176 are operated to control the size or extent of opening. Roof rocks travel solely under the influence of gravity, and will pass through the slot which will cause the rock to be deposited in a transverse strip. As preferred embodiment roof rock spreader 101 moves forward, the transverse strip of rock will also progress forward, deposited to a width defined by the longest dimension or length of the slot. The width of the slot extends in the direction of travel. Consequently, the width of the slot and speed of travel will control the thickness of rock 72 being deposited upon the roof. Control box 120, which may for exemplary purpose contain a processor, computer or other functional equivalent for command and control, will most preferably control both the speed of preferred embodiment roof rock spreader 101 through control of a drive motor or transmission associated therewith, and will also control controlled orifice and rock sensor 170 in association with the motion control of preferred embodiment roof rock spreader 101, to thereby obtain a smooth and even depth of rock.

When rock hopper 150 is emptied, which may for exemplary and non-limiting purpose be detected by load sensors 132 or other suitable sensors as described herein above, preferred embodiment roof rock spreader 101 is configured to travel to crane 90 or other suitable conveyor, hopper, or an equivalent where rock hopper 150 will be refilled. One concern, particularly with a highly autonomous roofrock spreader, is that the rock hopper 150 be properly aligned and positioned prior to triggering a release of roof rock from a crane or other source. Failure to achieve proper alignment can disable an entire roof rocking project until a spilled load is cleaned. This cleaning may require substantial manual intervention, depending upon the equipment available on the roof.

To avoid mishap during roof rock refill of rock hopper 150, a laser alignment system 135 is provided that must be immediately adjacent to a cooperative laser component. When laser alignment system 135 is in the proper position, then roof rock may be refilled into rock hopper 150. Where desired or not otherwise enabled, laser alignment system 135 may also be used as a communications channel, for exemplary purpose to communicate when load sensors 132 detect a full load and thereby stop the filling procedure.

Load sensors 132 may be used in combination with control box 120 or other computing system to determine and adjust in real time the fill level of each of the active preferred embodiment roof rock spreaders 101, for exemplary and non-limiting purpose to stay within building or building portion structural load limits. In addition, the status of each load can be monitored through communications system 125 in real time, to ensure that sufficient rock is available on the roof as needed, to thereby create a just-in-time delivery system.

Line following sensor 160 provides a low-cost and accurate sensor to assist with lining up roof rock spreader 101 prior to filling. Other sensors found in preferred embodiment roof rock spreader 101 include an obstacle avoidance system 134 which performs the named function, to avoid people, objects, areas, roof edges, and so forth that could otherwise have adverse effect.

For better protection of relatively delicate components, control box 120 and communications system 125 are boxed into distinct compartments.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

We claim:

1. In combination, a rock fill station, a laser alignment system, a computing system, and a roof rock spreader,
    said roof rock spreader comprising:
        a motive drive having a plurality of wheels configured to convey said roof rock spreader about a building roof;
        a rock hopper configured to temporarily store roofing rocks and subsequently discharge said roofing rocks to said building roof;
        a control system configured to control said motive drive and said rock hopper to traverse said building roof while distributing said roof rock in an even and consistent layer; and
        a plurality of wheel load sensors, individual ones of said plurality of wheels having at least one of said plurality of wheel load sensors coupled therewith that is configured to detect a wheel load;
    said rock fill station configured to automatically refill said rock hopper;
    said laser alignment system configured to detect proper alignment between said rock hopper and said rock fill station;
    said computing system comprising:
        a means to initiate said refill of said rock hopper responsive to said means to detect proper alignment detecting proper alignment between said rock hopper and said rock fill station; and
    a means to limit an extent of said refill of said rock hopper responsive to at least one detected wheel load exceeding a load limit.

* * * * *